(12) United States Patent
Youn et al.

(10) Patent No.: US 11,187,394 B2
(45) Date of Patent: Nov. 30, 2021

(54) LAMP FOR VEHICLE

(71) Applicant: SL Corporation, Daegu (KR)

(72) Inventors: Sungwook Youn, Seoul (KR); Jong-ryoul Park, Daegu (KR); Steve Davies, Clarkston, MI (US)

(73) Assignee: SL Corporation, Daegu (KR)

( * ) Notice: Subject to any disclaimer, the term of this patent is extended or adjusted under 35 U.S.C. 154(b) by 29 days.

(21) Appl. No.: 16/839,739

(22) Filed: Apr. 3, 2020

(65) Prior Publication Data

US 2021/0140602 A1 May 13, 2021

Related U.S. Application Data

(60) Provisional application No. 62/932,594, filed on Nov. 8, 2019.

(51) Int. Cl.
*F21S 41/657* (2018.01)
*F21S 45/47* (2018.01)
*F21S 41/19* (2018.01)
*F21V 14/02* (2006.01)
*B60Q 1/064* (2006.01)
*B60Q 1/06* (2006.01)
(Continued)

(52) U.S. Cl.
CPC .......... *F21S 41/657* (2018.01); *F21S 41/198* (2018.01); *F21S 45/47* (2018.01); *B60Q 1/045* (2013.01); *B60Q 1/0433* (2013.01); *B60Q 1/06* (2013.01); *B60Q 1/064* (2013.01); *B60Q 1/068* (2013.01); *B60Q 1/0683* (2013.01); *B60Q 1/0686* (2013.01); *B60Q 1/076* (2013.01); *B60Q 1/08* (2013.01); *B60Q 1/2642* (2013.01); *B60Q 2200/30* (2013.01); *B60Q 2200/34* (2013.01); *B60Q 2200/36* (2013.01); *F21V 14/02* (2013.01)

(58) Field of Classification Search
CPC ......... F21S 41/657; B60Q 1/06; B60Q 1/064; B60Q 1/068; B60Q 1/1683; B60Q 1/076; B60Q 1/0686; B60Q 1/045; B60Q 1/0433; B60Q 1/0438; F21V 14/02
See application file for complete search history.

(56) References Cited

U.S. PATENT DOCUMENTS 4,599,681 A * 7/1986 McMahan ............ B60Q 1/0683
362/275
4,737,891 A * 4/1988 Burton ................. B60Q 1/0683
362/249.1
(Continued)

FOREIGN PATENT DOCUMENTS

EP 2923888 A1 * 9/2015 ........... B60Q 1/0483

*Primary Examiner* — Alexander K Garlen
*Assistant Examiner* — Colin J Cattanach
(74) *Attorney, Agent, or Firm* — Nelson Mullins Riley & Scarborough LLP; Kongsik Kim, Esq.

(57) ABSTRACT

A lamp for a vehicle includes a plurality of optical modules, a first bracket arranged behind the plurality of optical modules, the first bracket performing aiming in a first direction for the plurality of optical modules, and a second bracket arranged between the plurality of optical modules and the first bracket, the second bracket performing aiming in a second direction that is orthogonal to the first direction for each of the plurality of optical modules. In particular, the second bracket is movably coupled to the first bracket to allow each of the plurality of optical modules to be aimed in the second direction as the second bracket moves.

17 Claims, 13 Drawing Sheets

(51) Int. Cl.
*B60Q 1/04* (2006.01)
*B60Q 1/26* (2006.01)
*B60Q 1/068* (2006.01)
*B60Q 1/076* (2006.01)
*B60Q 1/08* (2006.01)

(56) References Cited

U.S. PATENT DOCUMENTS

| | | | | |
|---|---|---|---|---|
| 7,144,145 | B2* | 12/2006 | Watanabe | F21S 41/155 |
| | | | | 362/544 |
| 7,537,366 | B2* | 5/2009 | Inoue | F21V 29/80 |
| | | | | 362/547 |
| 9,120,422 | B2* | 9/2015 | King | B60Q 1/0683 |
| 10,359,177 | B2* | 7/2019 | Shibata | F21S 45/33 |
| 10,495,276 | B2* | 12/2019 | Nakao | F21S 41/29 |
| 2003/0223245 | A1* | 12/2003 | Abe | B60Q 1/12 |
| | | | | 362/523 |
| 2005/0122737 | A1* | 6/2005 | Watanabe | F21S 41/153 |
| | | | | 362/544 |
| 2014/0029278 | A1* | 1/2014 | Burton | B60Q 1/0683 |
| | | | | 362/487 |
| 2015/0117042 | A1* | 4/2015 | Burton | B60Q 1/0683 |
| | | | | 362/487 |
| 2017/0120799 | A1* | 5/2017 | Wasilewski | B60Q 1/0041 |
| 2019/0001865 | A1* | 1/2019 | Burton | F16B 5/0241 |

\* cited by examiner

LAMP FOR VEHICLE

CROSS-REFERENCE TO RELATED APPLICATIONS

The present application claims the benefit of priority to U.S. Provisional Application No. 62/932,594 filed on Nov. 8, 2019, which is incorporated herein by reference in its entirety.

BACKGROUND

1. Technical Field

The present disclosure relates to a lamp for a vehicle including a plurality of optical modules, and more particularly, to a lamp for a vehicle capable of aiming at the same angle for each of the plurality of optical modules.

2. Description of the Related Art

A headlamp of a vehicle secures a driver's view in low light conditions (e.g., at night time) and informs other vehicles or pedestrians of the vehicle's presence. The headlamp includes a high beam and a low beam.

The high beam has a brightness that allows to see objects disposed at longer distances (e.g., about 100 m) and is often used in circumstances requiring a long light throw. However, the high beam may cause glare to a driver of an on-coming vehicle. The low beam is used to identify objects in shorter distances (e.g., about 30 m). Since the use of the high beam and the low beam have different effects, it is necessary to adjust a direction of light irradiation of the high beam and the low beam depending on a vehicle driving environment. Such adjustment of the light irradiation direction of the headlamp is referred to as aiming.

When the headlamp of the vehicle includes a plurality of optical modules, an irradiation direction of light may be adjusted by simultaneously aiming each of the plurality of optical modules. In the case where the plurality of optical modules are linearly arranged, if the aiming is performed on the entire plurality of optical modules, the displacement of the optical modules positioned at both ends may have a large deviation. If the plurality of optical modules are linearly arranged in a lengthwise direction, such a problem occurs especially when performing lengthwise aiming.

SUMMARY

Aspects of the present disclosure provide a lamp for a vehicle capable of improving the accuracy of aiming by performing individual aiming for each of a plurality of optical modules.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a lamp for a vehicle may include a plurality of optical modules; a first bracket arranged behind the plurality of optical modules, the first bracket performing aiming in a first direction for the plurality of optical modules; and a second bracket arranged between the plurality of optical modules and the first bracket, the second bracket performing aiming in a second direction that is orthogonal to the first direction for each of the plurality of optical modules. The second bracket may be movably coupled to the first bracket to allow each of the plurality of optical modules to be aimed in the second direction as the second bracket moves.

The lamp for the vehicle may further include a first pusher couple to the first bracket at a position spaced apart in the first direction by a predetermined distance from a pivot axis that extends in the second direction on the first bracket and configured to be moved in a third direction that is orthogonal to the first direction and the second direction to enable the first bracket to be rotated about the pivot axis, and a second pusher coupled to the second bracket through the first bracket and configured to enable the second bracket to be moved in the third direction. In particular, the plurality of optical modules may be collectively aimed in the first direction by a movement of the first pusher, and the plurality of optical modules may be individually aimed in the second direction by a movement of the second pusher.

The first bracket may include a plurality of position members that protrude from the first bracket toward the plurality of optical modules in the third direction, and the second bracket may include a plurality of aiming members that protrude from the second bracket toward the plurality of optical modules in the third direction. The each of the plurality of optical modules may include a first connector coupled to at least one of the plurality of position members and a second connector coupled to at least one of the plurality of aiming members. In response to moving the second bracket in the third direction toward the plurality of optical modules by the movement of the second pusher, the aiming members may move the each of the plurality of optical modules in the third direction via the second connector, thereby enabling the each of the plurality of optical modules to be aimed in the second direction.

A pair of position members among the plurality of position members may be disposed at a region corresponding to the each of the plurality of optical modules. Each of the plurality of aiming members may be disposed at a region corresponding to the each of the plurality of optical modules.

The plurality of optical modules may be arranged in a stepped manner. The aiming members may be formed in various lengths corresponding to an arrangement shape of the plurality of optical modules. In particular, at least two of the plurality of aiming members may have different lengths to correspond to a configuration of the plurality of optical modules.

The first bracket may rotate about a pivot axis, thereby performing a first direction aiming for the each of the plurality of optical modules. The plurality of optical modules may be linearly arranged, and the pivot axis may be parallel to an arrangement direction of the plurality of optical modules. The first bracket may include a pair of pivot bolts, and an imaginary line that connects between the pair of pivot bolts may correspond to the pivot axis.

The lamp for the vehicle may further include a first pusher coupled to the first bracket to push the first bracket forward or pull the first bracket backward. The second bracket may be moved in a front and rear direction to perform a second direction aiming for the each of the plurality of optical modules. The lamp for the vehicle may further include a second pusher coupled to the second bracket to move the second bracket in the front and rear direction. The second bracket may include openings in regions corresponding to the plurality of position members, and the plurality of position members may be inserted through the opening.

Each of the plurality of optical modules may include a light source for emitting light, a lens for diffusing the light emitted from the light source, and a heat sink for dissipating heat generated from the light source. Each of the plurality of optical modules may include a pair of first connectors for first direction aiming, and a second connector for second direction aiming. In particular, the pair of first connectors may be spaced apart from each other along the first direction, and the second connector may be spaced apart along the second direction from an imaginary line that connects between the pair of first connectors. The pair of first connectors may be coupled to position members of the first bracket, and the second connector may be coupled to aiming members of the second bracket.

According to exemplary embodiments of the present disclosure, at least the following effects may be achieved. In a lamp for a vehicle according to the present disclosure, each of a plurality of optical modules may have the same displacement when performing aiming, thereby improving the accuracy of the aiming.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
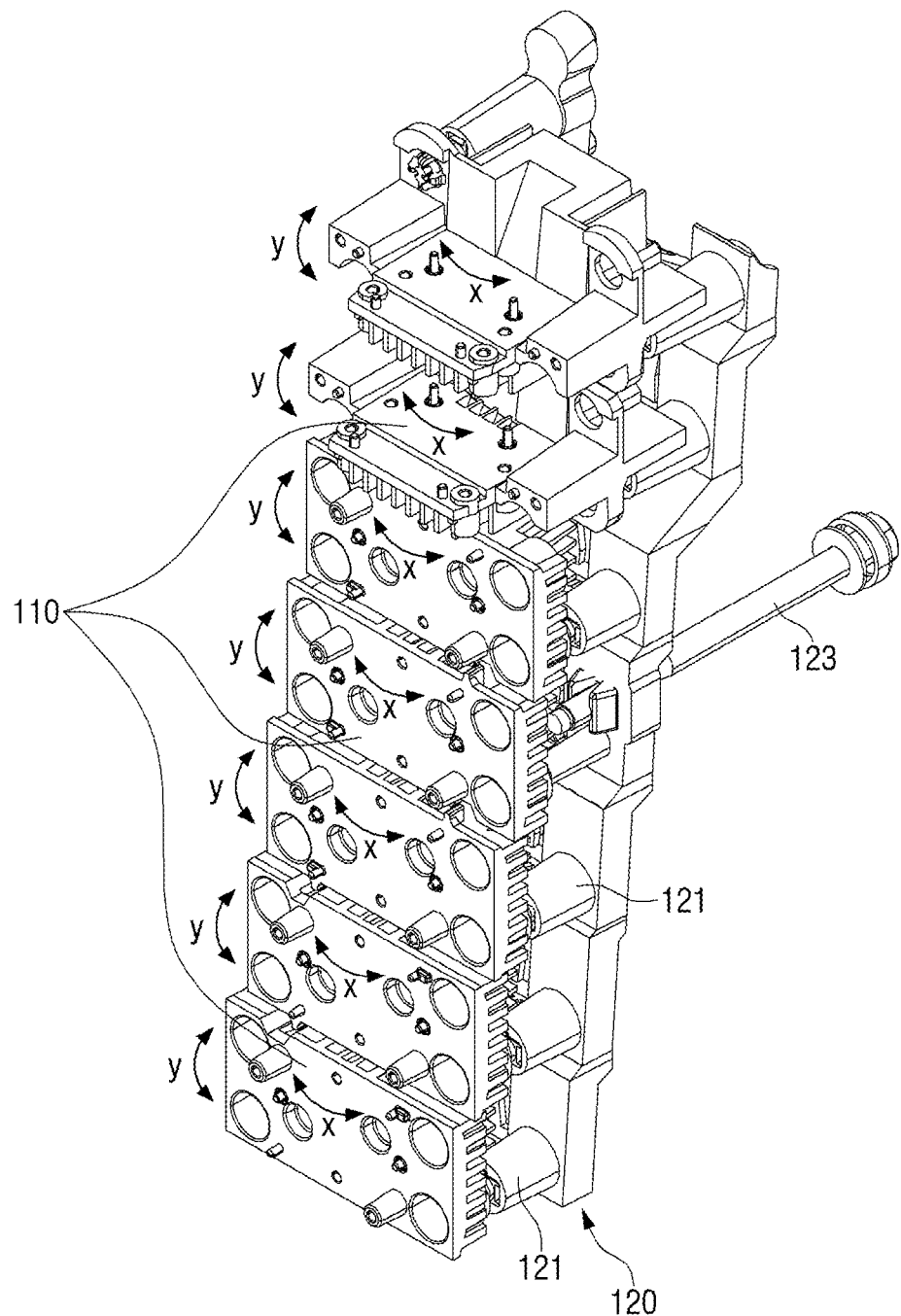
FIG. 1 is a perspective view of a lamp for a vehicle according to a first exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, the present disclosure will be described with reference to the drawings for explaining a lamp for a vehicle according to exemplary embodiments of the present disclosure.

Figure 2:
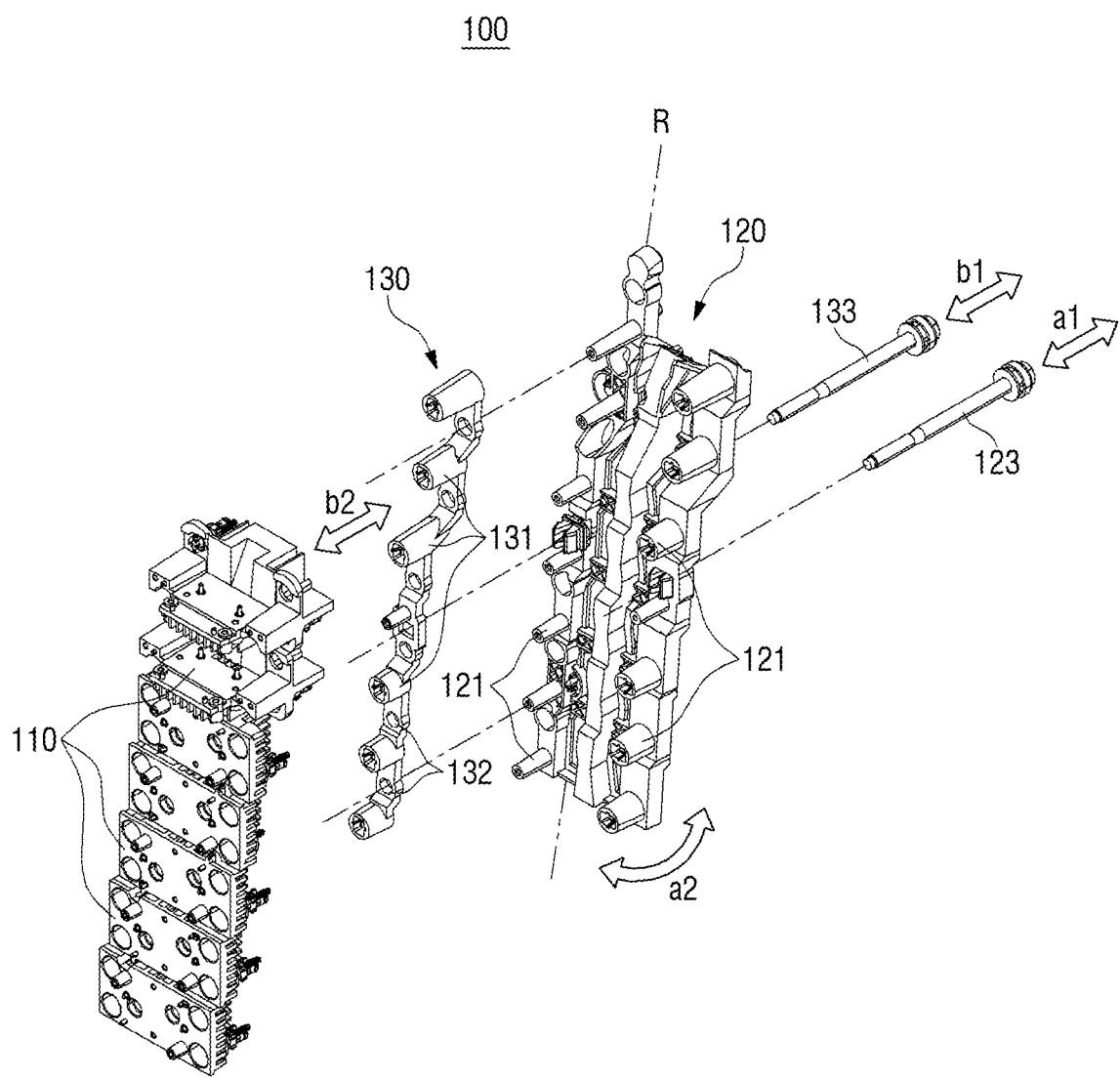
FIG. 2 is an exploded perspective view of the lamp for the vehicle according to the first exemplary embodiment of the present disclosure.
Figure 3:
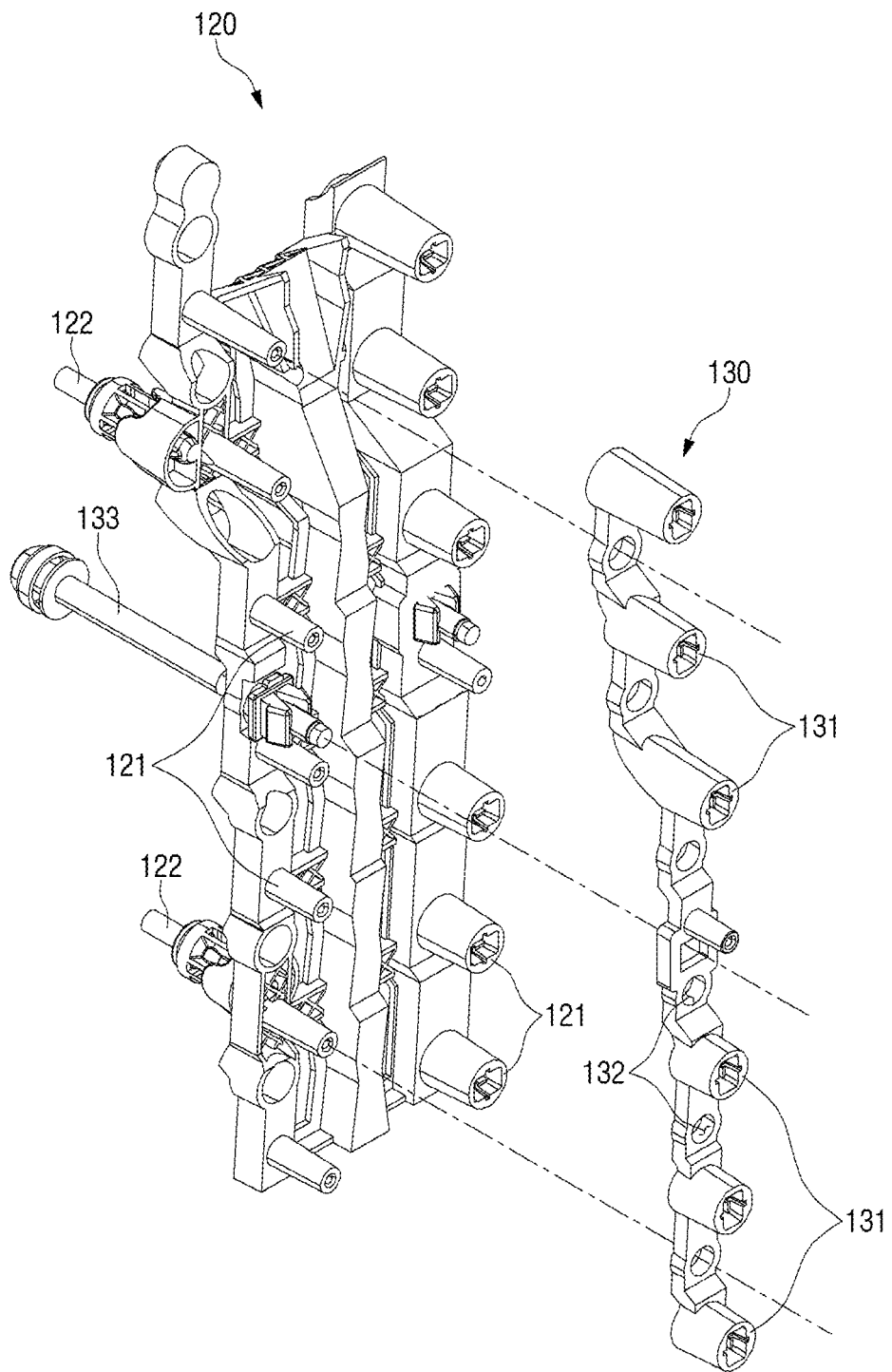
FIG. 3 is a front perspective view of the coupling relationship between a first bracket and a second bracket according to the first exemplary embodiment of the present disclosure.
Figure 4:
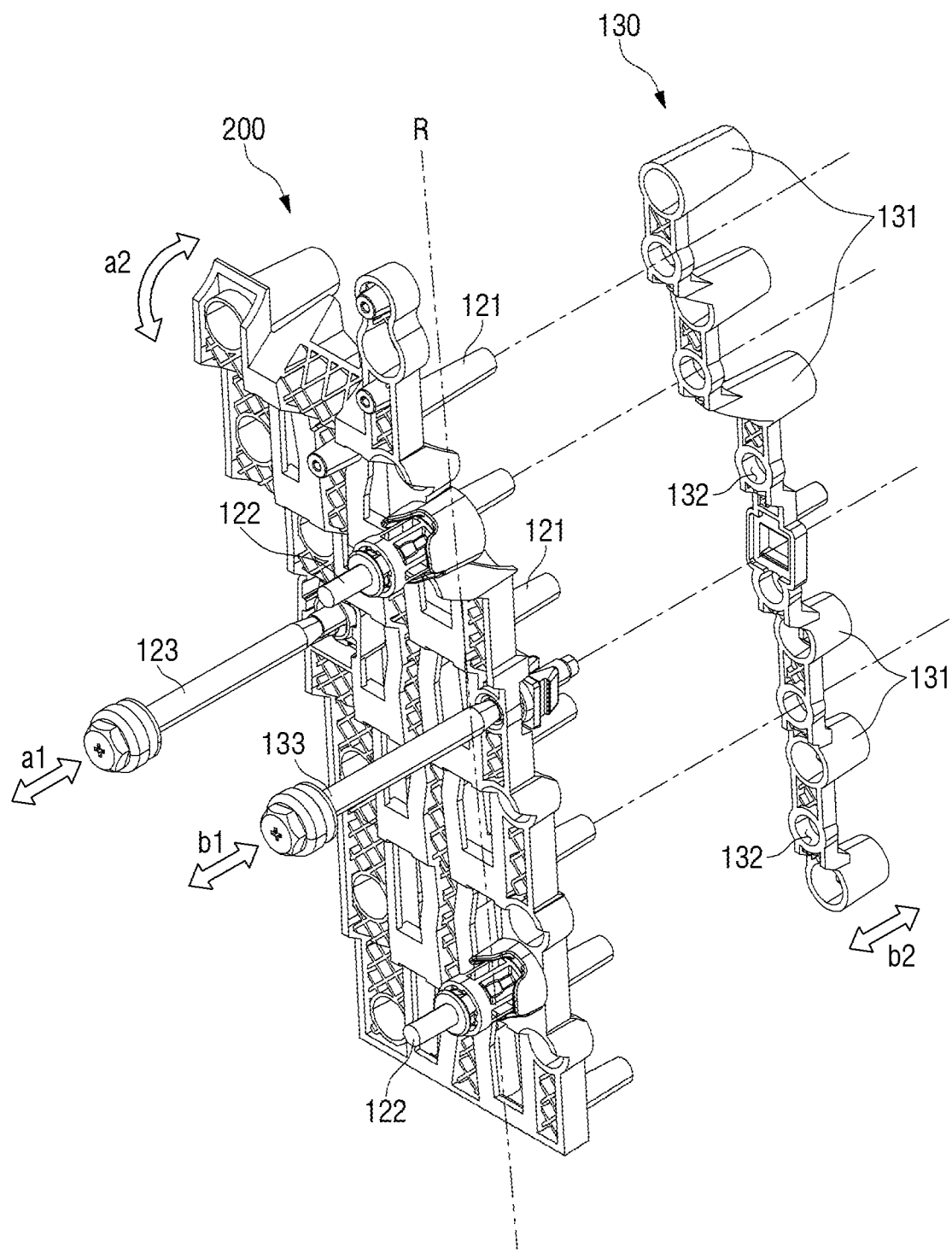
FIG. 4 is a rear perspective view of the coupling relationship between the first bracket and the second bracket according to the first exemplary embodiment of the present disclosure.
Figure 5:
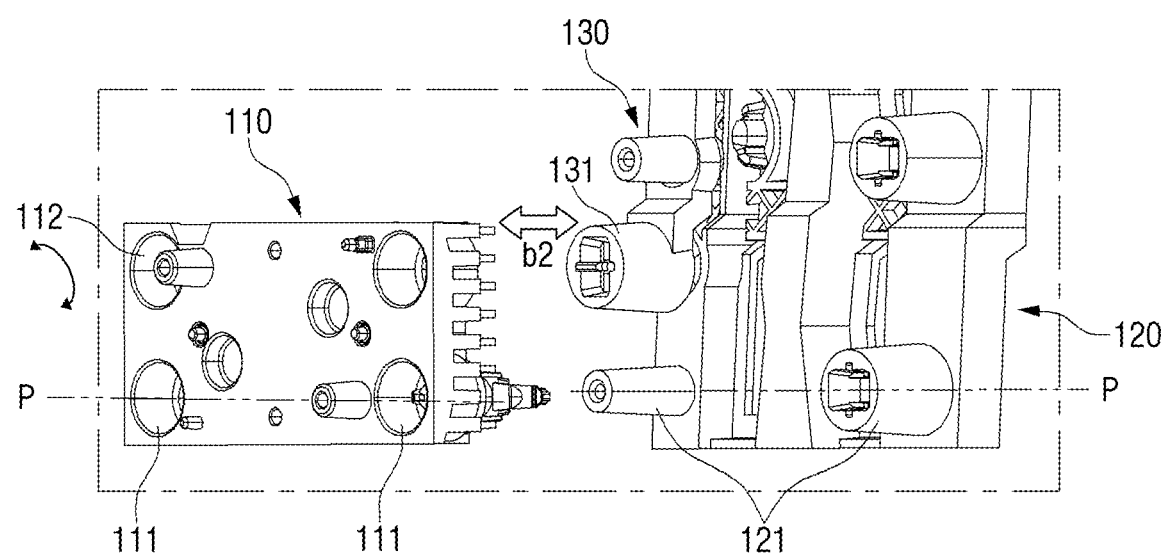
FIG. 5 is a diagram illustrating a principle of how aiming is performed on an optical module according to the first exemplary embodiment of the present disclosure.

FIG. 1 is a perspective view of a lamp for a vehicle according to a first exemplary embodiment of the present disclosure. FIG. 2 is an exploded perspective view of the lamp for the vehicle according to the first exemplary embodiment of the present disclosure. FIG. 3 is a front perspective view of the coupling relationship between a first bracket and a second bracket according to the first exemplary embodiment of the present disclosure. FIG. 4 is a rear perspective view of the coupling relationship between the first bracket and the second bracket according to the first exemplary embodiment of the present disclosure. FIG. 5 is a diagram illustrating a principle of how aiming is performed on an optical module according to the first exemplary embodiment of the present disclosure.

Referring to FIGS. 1 to 5, a lamp for a vehicle 100 according to the first exemplary embodiment of the present disclosure may include a plurality of optical modules 110, a first bracket 120 arranged behind the optical modules 110, and a second bracket 130 arranged between the optical modules 110 and the first bracket 120. Each of the plurality of optical modules 110 may include a light source that emits light, a lens that diffuses the light, a heat sink that dissipates heat generated from the light source, or the like. FIGS. 1 and 2 exemplify a configuration in which the plurality of optical modules 110 are linearly arranged. However, the arrangement of the optical modules 110 is not limited thereto and may be arranged in various configurations.

The first bracket 120 may rotate about a pivot axis R to perform first direction aiming for each of the plurality of optical modules 110. Hereinafter, for convenience of description, the first direction may be defined as a widthwise direction (or a horizontal direction or the x direction in FIG. 1). In addition, the second direction may be defined as a lengthwise direction (or a vertical direction or the y direction in FIG. 1). Widthwise aiming may adjust the optical axis by rotating the optical module 110 about a vertical axis, and lengthwise aiming may adjust the optical axis by rotating the optical module 110 about a horizontal axis.

A straight imaginary line connecting between the pair of pivot bolts 122 may become the pivot axis R of the first bracket 120. The first pusher 123 may be provided on a rear surface of the first bracket 120. The first pusher 123 may be spaced apart from the pivot axis R by a predetermined distance, and may push the first bracket 120 forward or pull it backward. When the first pusher 123 pushes or pulls the first bracket 120, the first bracket 120 may rotate about the pivot axis R and perform the first direction aiming for each of the plurality of modules.

The first bracket 120 may include a position member 121 that protrudes forward. The position member 121 may perform the widthwise aiming by pushing each of the plurality of optical modules 110 forward or pulling it backward when the first bracket 120 rotates. In addition, the pair of position members 121 arranged widthwise may act as an aiming axis P in a second aiming process to be described below.

The second bracket 130 may be arranged between the first bracket 120 and the plurality of optical modules 110. The second bracket may include an aiming member 131 that protrudes forward. The second bracket 130 may include an opening 132 through which the position member 121 may be inserted. A second pusher 133 may be provided in a region of the second bracket 130. The second pusher 133 may push the second bracket 130 forward or pull it backward. When the second bracket 130 translates in a front and rear direction by the second pusher 133, the aiming member 131 may perform the lengthwise aiming for each of the plurality of optical modules 110.

Hereinafter, the coupling relationship between the first bracket 120 and the second bracket 130 will be described.

The position member 121 of the first bracket 120 may be formed at a position corresponding to a first connector 111 formed in each of the plurality of optical modules 110. In addition, the aiming member 131 of the second bracket 130 may be formed at a position corresponding to a second connector 112 formed in each of the plurality of optical modules 110. The position member 121 may be inserted through the opening 132 of the second bracket 130. The position member 121 and the aiming member 131 may be alternately arranged to perform the widthwise aiming and the lengthwise aiming for each of the optical modules 110.

The second bracket 130 may move forward or backward along the position member 121 inserted through the opening 132. In addition, the second pusher 133 configured to apply an external force to the second bracket 130 may be inserted through the first bracket 120.

Hereinafter, the process of widthwise aiming and lengthwise aiming will be described in more detail.

Each of the plurality of optical modules 110 may include a first connector 111 and a second connector 112. The first connector 111 may be coupled to an end of the position member 121 of the first bracket 120, and the second connector 112 may be coupled to an end of the aiming member 131 of the second bracket 130. A coupling part between the first connector 111 and the position member 121 and a coupling part between the second connector 112 and the aiming member 131 may be pivotally coupled using an element such as a ball joint and the like.

The plurality of position members 121 formed on the first bracket 120 may be formed in various lengths to correspond to a configuration in which the plurality of optical modules 110 are arranged. If the plurality of optical modules 110 are arranged in a stepped manner, a length of the plurality of position members 121 formed on the first bracket 120 may be formed in such a manner that the length increases or decreases gradually toward one direction. The plurality of aiming members 131 formed on the second bracket 130 may also be formed in various lengths corresponding to the configuration in which the optical module 110 is arranged.

As will be described below, aiming may be simultaneously performed on each of the plurality of optical modules 110 by moving the first bracket 120 and the second bracket 130. Moreover, separate aiming may be performed for each module by manually adjusting the coupling parts between the first connector 111 and the position member 121, and between the second connector 112 and the aiming member 131.

Hereinafter, for convenience of description, each element for performing aiming based on an optical module 110 will be described. Each of the plurality of optical modules 110 may be formed to have a similar structure as the optical module 110 described below.

The optical module 110 may include a pair of first connectors 111 and a second connector 112. The pair of first connectors 111 may be spaced apart by a predetermined distance in the horizontal direction. The second connector 112 may be spaced apart from the first connector 111 in the vertical direction by a predetermined distance. According to an exemplary embodiment of the present disclosure, the optical module 110 may be formed in a quadrangle, and the first connector 111 and the second connector 112 may be provided in corner regions of the quadrangle. The quadrangle may include two corners at a top region and two corners at a bottom region. For example, the pair of first connectors 111 may be provided at the top corners, and the second connector 112 may be provided at one of the bottom corners. On the contrary, the pair of first connectors 111 may be provided at the bottom corners, and the second connector 112 may be provided at one of the top corners. A shape of the optical module 110 or a position at which the first connector 111 and the second connector 112 are formed is not limited by the above description, and the shape of the optical module 110 or the position of the first connector 111 and the second connector 112 may be varied.

The position member 121 of the first bracket 120 may be formed at a position corresponding to the first connector 111 of the optical module 110, and an end of the position member 121 may be coupled with the first connector 111.

Therefore, when the first pusher 123 exerts a force forward or backward (a1), the first bracket 120 may be rotated about the pivot axis R (a2), and the position member 121 may also be displaced forward or backward as the first bracket 120 rotates, thereby causing an orientation angle of the optical module 110 to be adjusted.

As described above, the pair of first connectors 111 included in an optical module 110 may be spaced apart in the horizontal direction. When the first bracket 120 rotates about the pivot axis R in the vertical direction, a displacement amount of each position member 121 coupled with each of the pair of first connectors 111 may be different from each other. Therefore, as the first bracket 120 rotates, the widthwise aiming of the optical module 110 may be performed.

The aiming member 131 of the second bracket 130 may be formed at a position corresponding to the second connector 112 of the optical module 110, and an end of the aiming member 131 may be coupled to the second connector 112. Therefore, when the second pusher 133 exerts a force forward or backward (b1), the second bracket 130 may be translated forward or backward (b2). As the second bracket 130 performs the translational movement, the aiming member 131 may also move forward or backward, and the second connector 112 may also move forward or backward, thereby enabling the lengthwise aiming for the optical module 110.

Specifically, when the aiming member 131 moves forward or backward, the optical module 110 may be rotated about a line connecting between the pair of first connectors 111 (or the pair of position members 121), i.e., the aiming axis P. Therefore, the lengthwise aiming to rotate about a horizontal axis may be performed.

The widthwise aiming and the lengthwise aiming described above may be independently performed for each of the plurality of optical modules 110. Each of the optical modules 110 may include an independent aiming axis P, and may include an independent pressing point (first connector 111 and second connector 112), thereby enabling to independently perform aiming for each of the plurality of optical modules 110. This configuration may enable precise adjustment of optical axis. In addition, the entirety of the plurality of optical modules 110 may be simultaneously aimed at the same time by driving the first pusher 123 and the second pusher 133, thereby ensuring convenience of operation.

Hereinafter, a lamp for a vehicle 200 according to a second exemplary embodiment of the present disclosure will be described.

Figure 6:
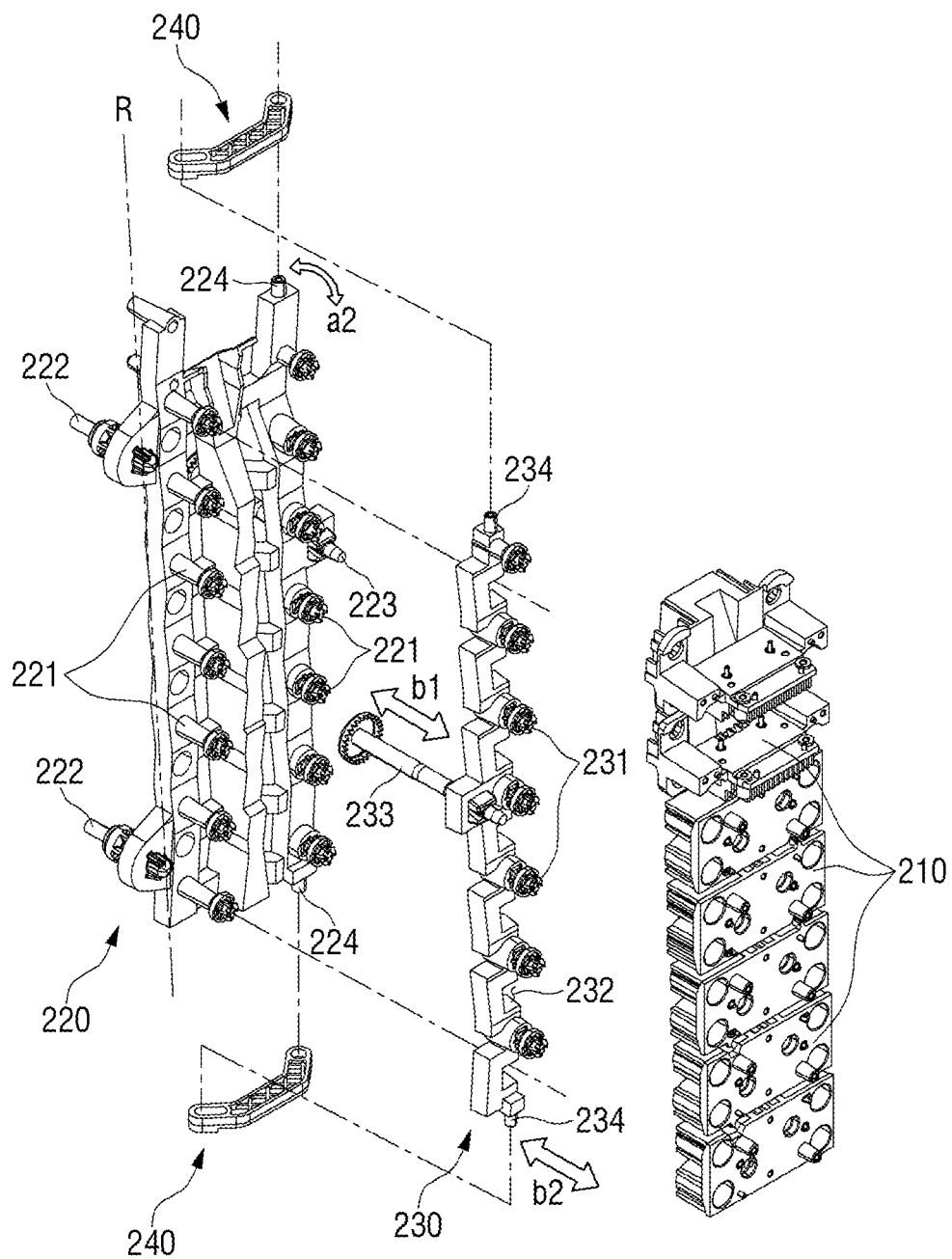
FIG. 6 is an exploded perspective view of a lamp for a vehicle according to a second exemplary embodiment of the present disclosure.
Figure 7:
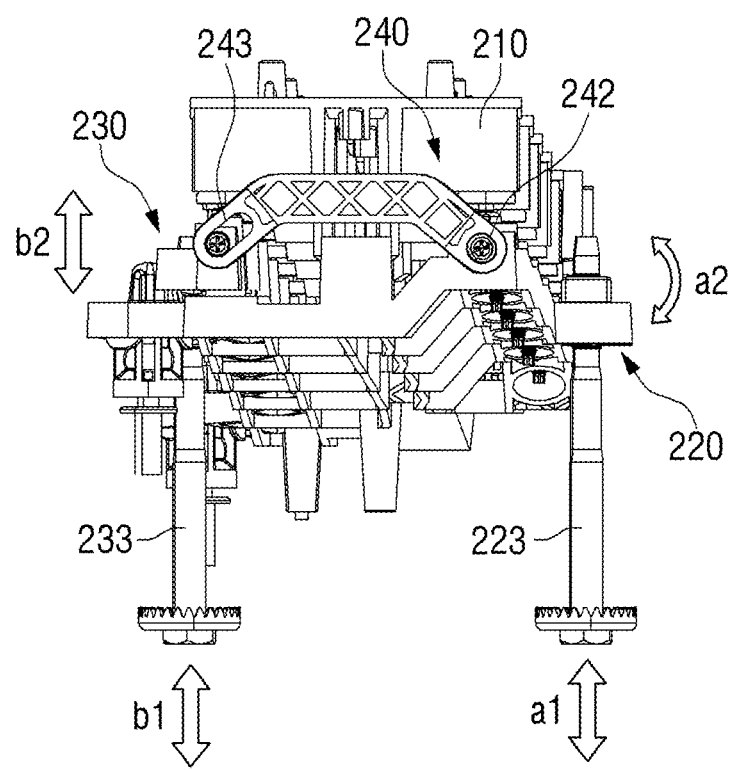
FIG. 7 is a bottom view of the lamp for the vehicle according to the second exemplary embodiment of the present disclosure.
Figure 8A:
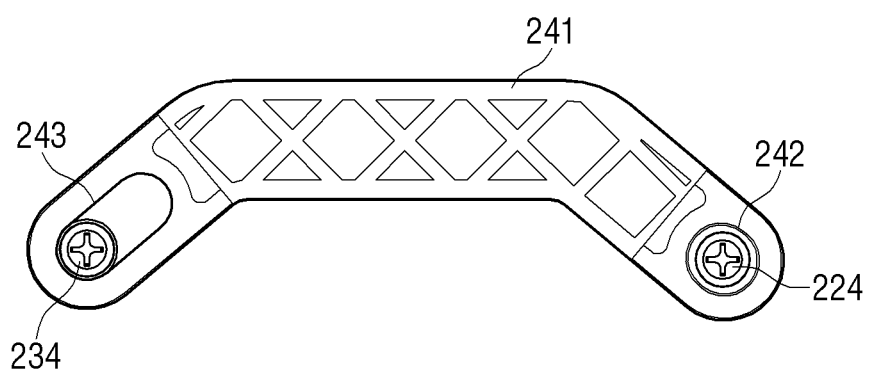
FIGS. 8A and 8B illustrate a link member rotating, according to the second exemplary embodiment of the present disclosure.
Figure 8B:
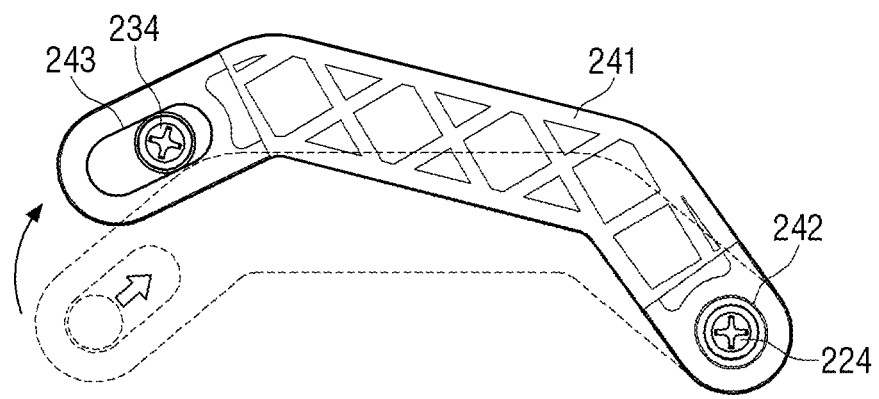

FIG. 6 is an exploded perspective view of a lamp for a vehicle according to the second exemplary embodiment of the present disclosure. FIG. 7 is a bottom view of the lamp for the vehicle according to the second exemplary embodiment of the present disclosure. FIGS. 8A and 8B illustrate a link member rotating, according to the second exemplary embodiment of the present disclosure.

Referring to FIG. 6, the lamp for the vehicle 200 according to the second exemplary embodiment of the present disclosure may include a plurality of optical modules 210, a first bracket 220 arranged behind the optical modules 210, a second bracket 230 arranged between the optical modules 210 and the first bracket 220, and a link member 240. The optical module 210, the first bracket 220, and the second bracket 230 of the lamp for the vehicle 200 according to the second exemplary embodiment of the present disclosure may be formed similarly as the first exemplary embodiment described above. Accordingly, the following description will focus on the differences from the first exemplary embodiment.

The link members 240 may be provided in pairs, namely, one at a first end and the other at a second end of the first bracket 220. The pair of link members 240 may be formed in the substantially same shape. As an example, a first end of one link member 240 may be coupled to the first bracket 220, and a second end thereof may be coupled to the second bracket 230. Second connectors 224 may be formed at both ends of the first bracket 220, and first connectors 234 may be formed at both ends of the second bracket 230. The first end of the link member 240 may be coupled to the second connector 224, and the second end of the link member 240 may be coupled to the first connector 234. In particular, the link member 240 may be rotatably coupled to the second connector 224 and the first connector 234.

As described above, the link member 240 may connect the first bracket 220 and the second bracket 230 which may be independently moved by the first pusher 223 and the second pusher 233, respectively. Accordingly, the lamp for the vehicle according to the exemplary embodiments of the present disclosure may improve the resistance to vibration.

Referring to FIGS. 7 and 8B, the link member 240 may include a body 241, a first aperture 242, and a second aperture 243. The body 241 may connect an end of the first bracket 220 and an end of the second bracket 230. The second connector 224 may be inserted into the first aperture 242 to couple the first bracket 220 and the link member 240. The first connector 234 may be inserted into the second aperture 243 to couple the second bracket 230 and the link member 240.

In particular, in order to prevent the movement of the first bracket 220 and the second bracket 230 from being obstructed by the link member 240, at least one of the first aperture 242 or the second aperture 243 may be formed in an elliptical shape. The first aperture 242 or the second aperture 243 formed in the elliptical shape may be referred to as a slot. Hereinafter, the movement of the link member 240 will be described based on an exemplary embodiment in which the second aperture 243 is formed in the elliptical shape.

When the first bracket 220 rotates about the pivot axis R (a2) due to an external force applied by the first pusher 223 (a1), or when the second bracket 230 moves in the front and rear direction (b2) due to an external force applied by the second pusher 233 (b1), the link member 240 may rotate in response to the displacement of the first bracket 220 or the second bracket 230. When the link member 240 rotates, the first connector 234 may move within the elliptical second aperture 243.

FIGS. 8A and 8B show an exemplary embodiment in which the second bracket 230 moves forward by pressing the second pusher 233. Specifically, FIG. 8A shows the link member 240 in an initial state, and FIG. 8B shows the movement of the link member 240 when the second bracket 230 moves forward while the first bracket 220 is stationary. In FIGS. 8A and 8B, the upper side may correspond to the front of the lamp for the vehicle 200, and the lower side may correspond to the rear of the lamp for the vehicle 200. Referring to FIGS. 8A and 8B, when the second bracket 230 moves forward, the link member 240 may rotate around the first aperture 242 in which the second connector 224 is inserted. Concurrently, the first connector 234 may move along the inside of the elliptical second aperture 243 and may move forward.

Hereinafter, a lamp for a vehicle 300 according to a third exemplary embodiment of the present disclosure will be described.

Figure 9:
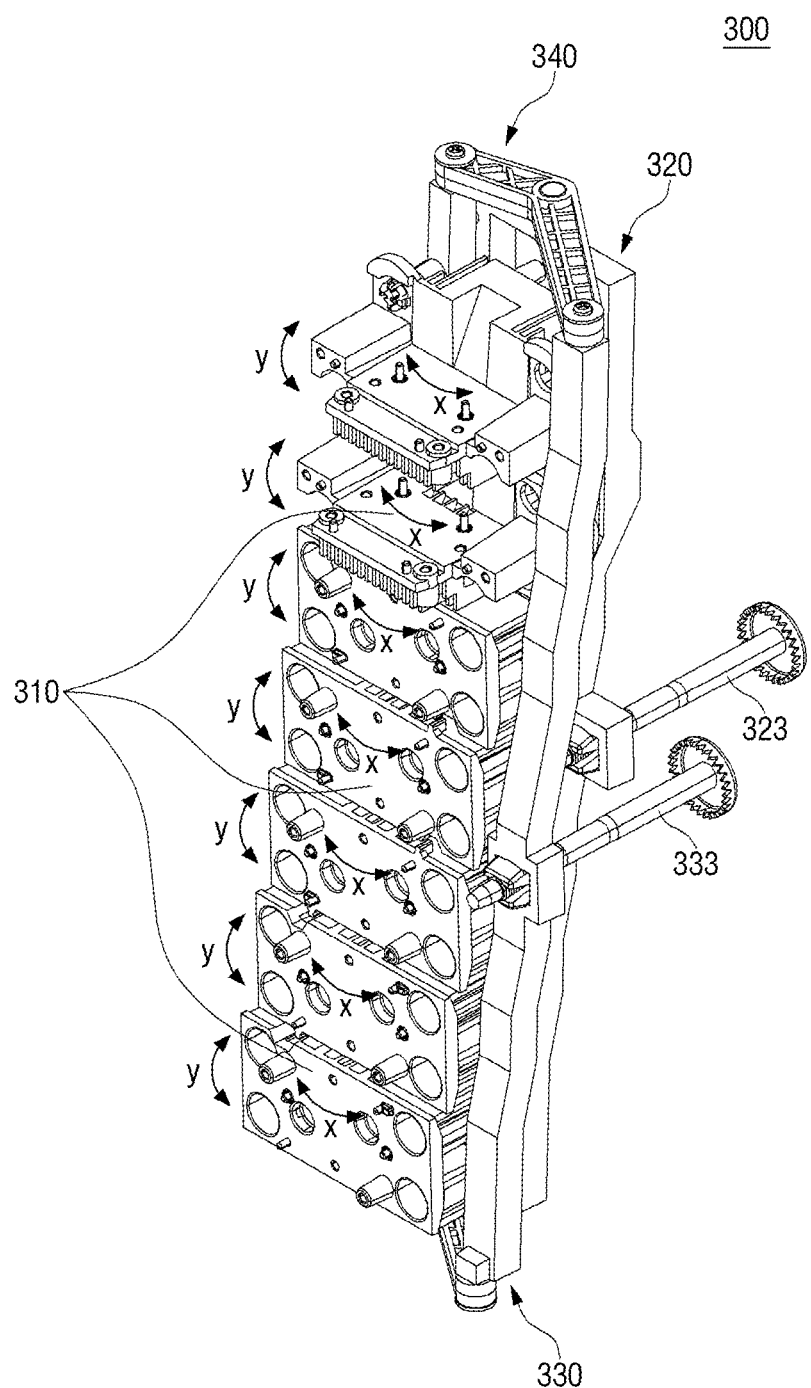
FIG. 9 is a front perspective view of a lamp for a vehicle according to a third exemplary embodiment of the present disclosure.
Figure 10:
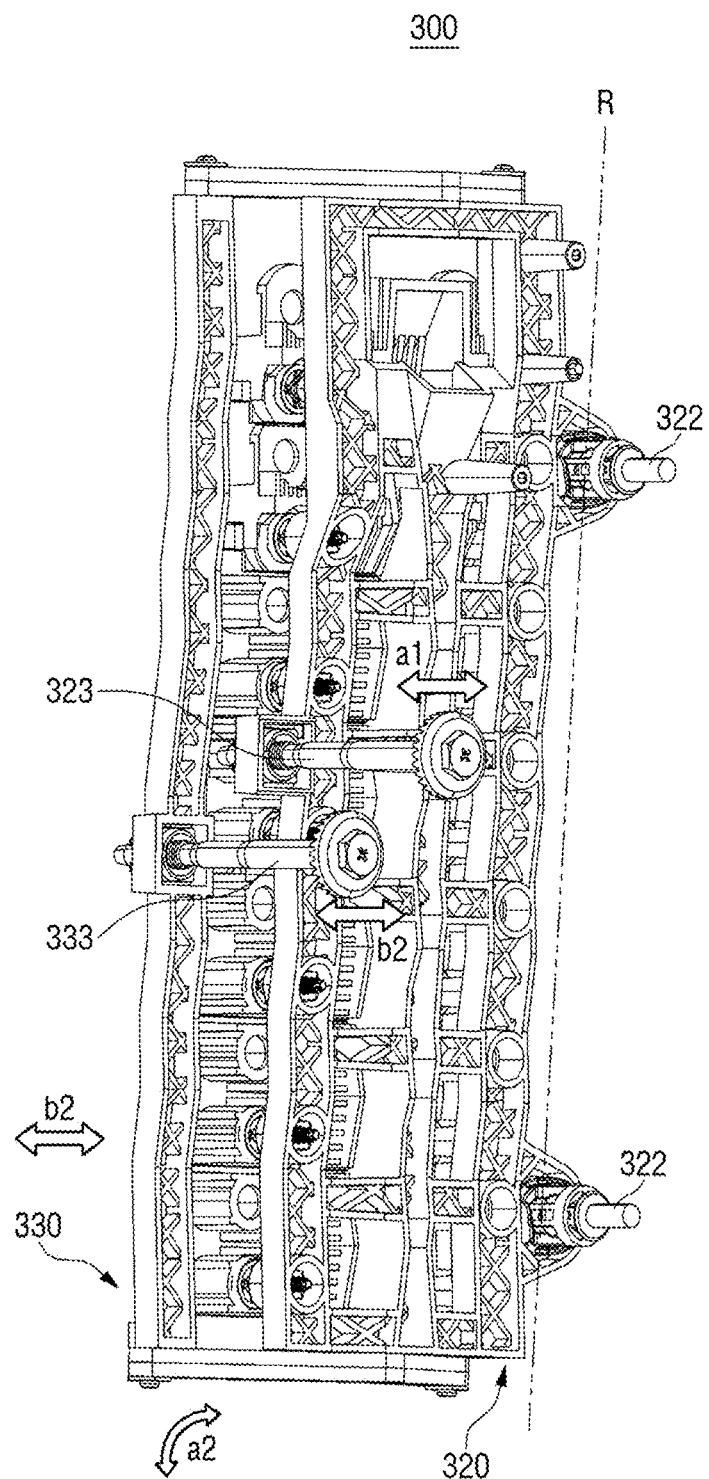
FIG. 10 is a rear perspective view of the lamp for the vehicle according to the third exemplary embodiment of the present disclosure.
Figure 11:
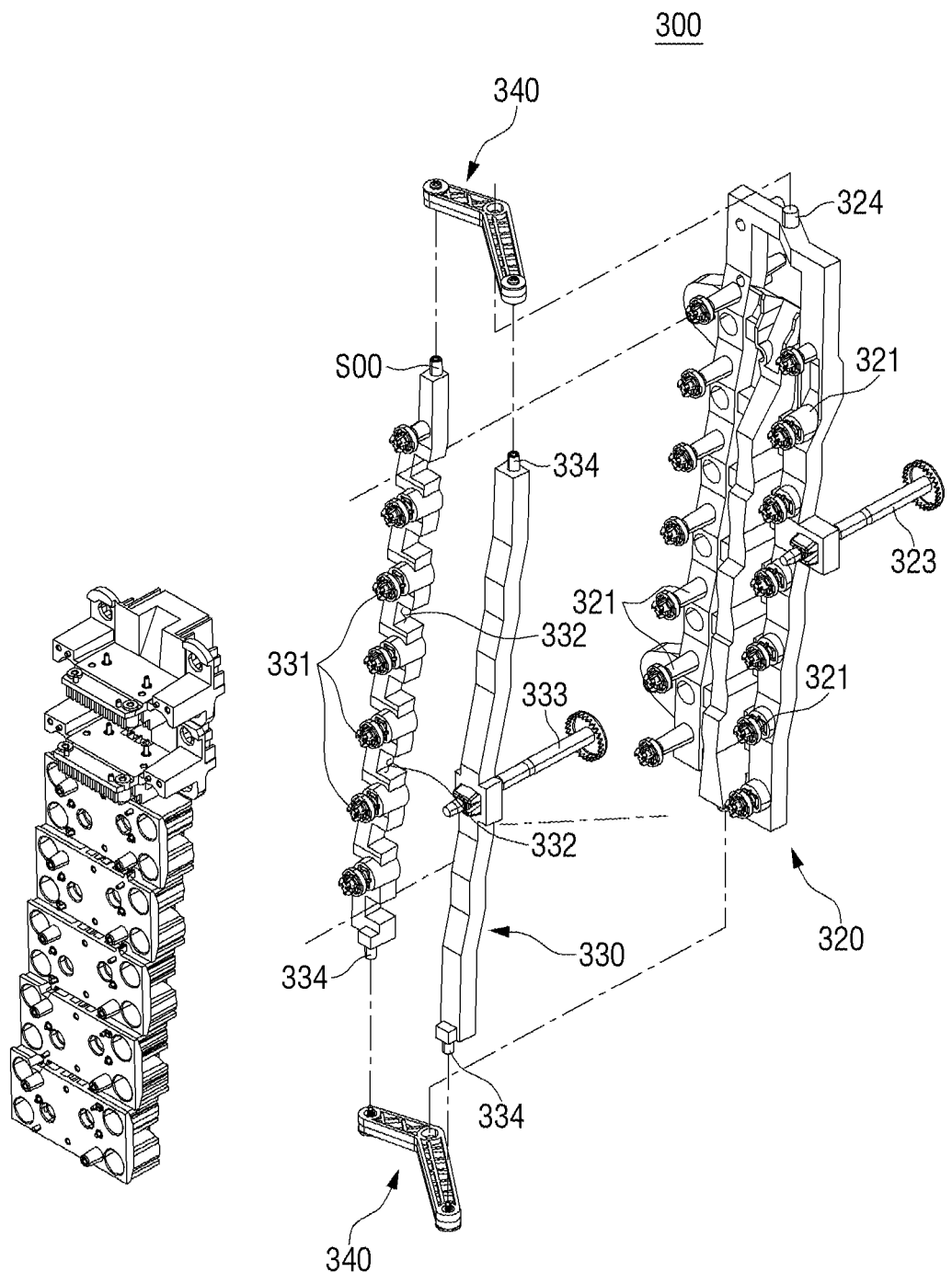
FIG. 11 is an exploded perspective view of FIG. 10 according to the third exemplary embodiment of the present disclosure.
Figure 12:
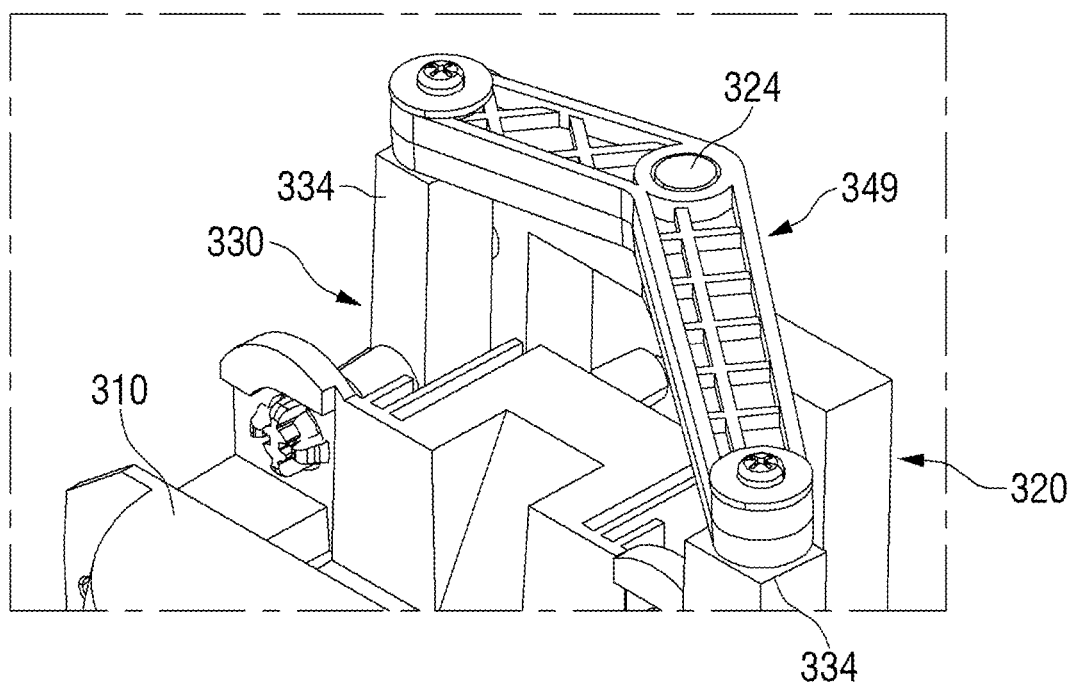
FIG. 12 is an enlarged view of a link member according to the third exemplary embodiment of the present disclosure.
Figure 13:
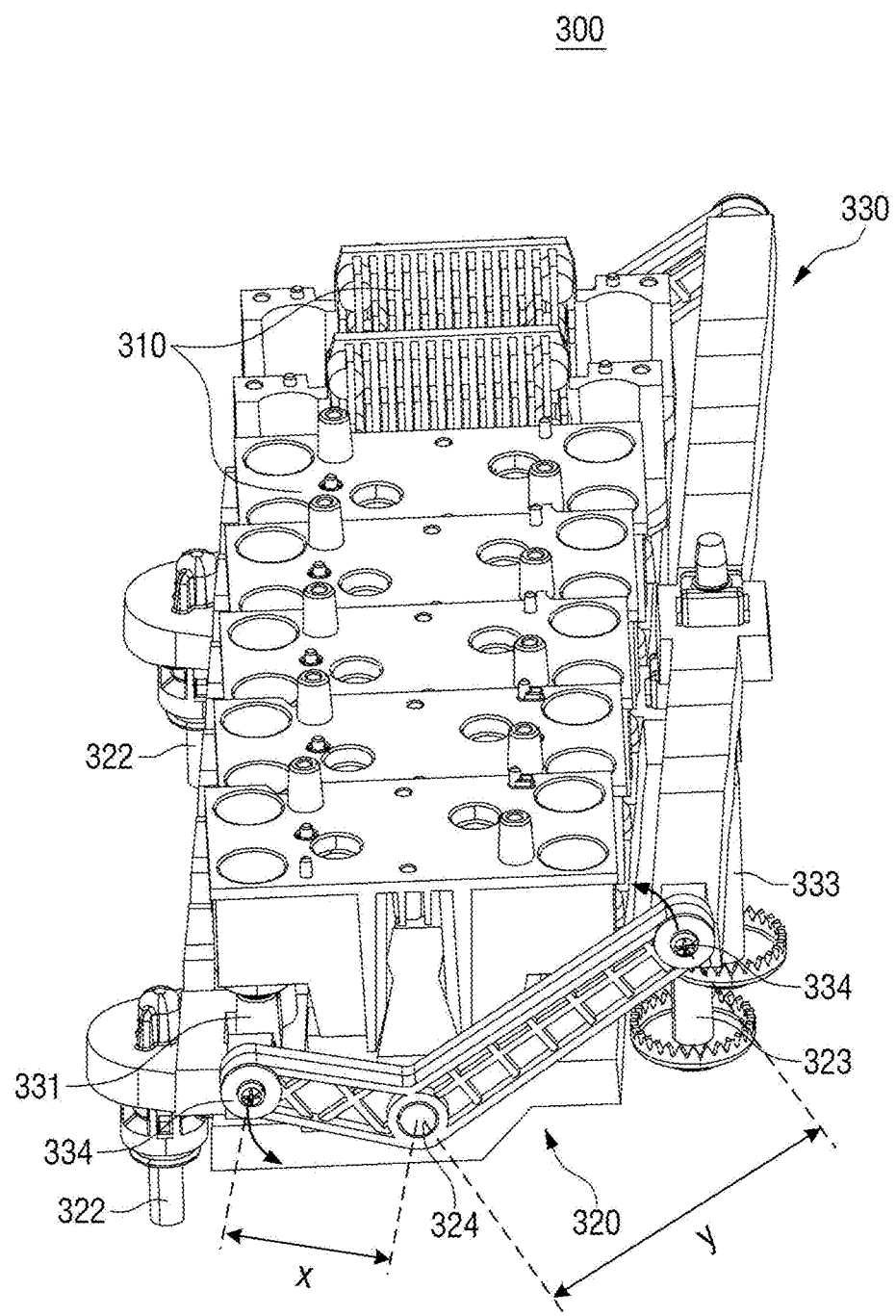
FIG. 13 illustrates a link member rotating due to a movement of a second bracket, according to the third exemplary embodiment of the present disclosure.

FIG. 9 is a front perspective view of a lamp for a vehicle according to the third exemplary embodiment of the present disclosure. FIG. 10 is a rear perspective view of the lamp for the vehicle according to the third exemplary embodiment of the present disclosure, and FIG. 11 is an exploded perspective view of FIG. 10. FIG. 12 is an enlarged view of a link member according to the third exemplary embodiment of the present disclosure. FIG. 13 illustrates a link member rotating due to a movement of a second bracket, according to the third exemplary embodiment of the present invention.

Referring to FIGS. 9 to 12, the lamp for the vehicle 300 according to the third exemplary embodiment of the present disclosure may include a plurality of optical modules 310, a first bracket 320 arranged behind the optical modules 310, a second bracket 330 arranged between the optical modules 310 and the first bracket 320, and a link member 340. The optical module 310, the first bracket 320, and the second bracket 330 of the lamp for the vehicle 300 according to the third exemplary embodiment of the present disclosure may be similar to the first exemplary embodiment described above. Accordingly, the following description will focus on the differences from the first exemplary embodiment.

Like the link member 240 according to the second exemplary embodiment described above, the link members 340 according to the third exemplary embodiment of the present disclosure may be provided in pairs, one at a first end and the other at a second end of the first bracket 320, and the pair of link members 340 may be formed in the substantially same shape. Hereinafter, for convenience of description, one link member 340 will be described as an example.

Some portion of the link member 340 may be coupled to the first bracket 320, and some portion of the link member 340 may be coupled to the second bracket 330. Specifically, a pair of first connectors 334 may be respectively formed at each end of the second bracket 330. Each of the pair of first connectors 334 formed at one end of the second bracket 330 may be coupled to each end of the link member 340. In addition, a second connector 324 may be formed at one end of the first bracket 320. The second connector 324 formed at the one end of the first bracket 320 may be coupled to a mid-section of the link member 340. In particular, the link member 340 may be rotatably coupled to the second connector 324 and the first connector 334. In addition, at least one of both ends of the link member 340 may include an elliptical slot to allow the first connector 334 to be movably coupled within the slot.

When the first bracket 320 or the second bracket 330 is moved, the link member 340 may rotate around where it is coupled with the second connector. Hereinafter, referring to FIG. 13, the rotation of the link member 340 due to the movement of the second bracket 330 will be described. In FIG. 13, the upper side may correspond to the front of the lamp for the vehicle 300, and the lower side may correspond to the rear of the lamp for the vehicle 300.

As illustrated in FIG. 13, when a second pusher 333 formed on the right side of the second bracket 330 moves forward, a right end of the link member 340 may also move forward. Subsequently, the link member 340 may rotate about the second connector 324 of the first bracket 320, and thus, a left end of the link member 340 may move backward. As the link member 340 rotates, the left end of the second bracket 330 coupled with the left end of the link member 340 may move backward, and thus the aiming member 331 may also move backward. Accordingly, the lengthwise aiming of each of the optical modules 310 may be performed.

The link member 340 may include two arms that extend in two directions from the second connector 324 which corresponds to the center of rotation of the link member 340. A distal end of a first arm (the portion indicated by x in FIG. 13) among the two arms may be rotatably coupled to the second bracket 330 by one of the first connectors 334 that is closer to the aiming member 331. The distal end of the first arm will be herein referred to as the first end of the link member 340. A distal end of a second arm (the portion indicated by y in FIG. 13) among the two arms may be rotatably coupled to the second bracket 330 by the other of the first connectors 334 that is closer to the second pusher 333. The distal end of the second arm will be herein referred to as the second end of the link member 340. By adjusting a distance x between the first end of the link member 340 and the second connector 324 and adjusting a distance y between the second end of the link member 340 and the second connector 324, the precision of the lengthwise aiming may be adjusted. In particular, a ratio of the two distances x/y may be defined as a distance ratio.

As the distance ratio x/y is decreased, the aiming may be more precisely performed because even if the displacement of the second pusher 333 is greater, the displacement of the aiming member 331 may become smaller. On the other hand, as the distance ratio x/y is increased, the aiming operation of greater displacement may be performed even with smaller displacement of the second pusher 333.

In concluding the detailed description, those skilled in the art will appreciate that many variations and modifications can be made to the exemplary embodiments without substantially departing from the principles of the present disclosure. Therefore, the disclosed exemplary embodiments of the present disclosure are used in a generic and descriptive sense only and not for purposes of limitation.

What is claimed is:

1. A lamp for a vehicle, comprising:
   a plurality of optical modules;
   a first bracket arranged behind the plurality of optical modules, the first bracket performing aiming in a first direction for the plurality of optical modules;
   a second bracket arranged between the plurality of optical modules and the first bracket, the second bracket performing aiming in a second direction that is orthogonal to the first direction for each of the plurality of optical modules; and
   a second bracket pusher coupled to the second bracket through the first bracket, the second bracket pusher enabling the second bracket to be moved in a third direction that is orthogonal to the first direction and the second direction,
   wherein the second bracket is movably coupled to the first bracket to allow each of the plurality of optical modules to be individually aimed in the second direction as the second bracket is moved in the third direction by the second bracket pusher.

2. The lamp for the vehicle of claim 1, further comprising:
   a first bracket pusher coupled to the first bracket at a position spaced apart in the first direction by a predetermined distance from a pivot axis that extends in the second direction on the first bracket, wherein the first bracket pusher is configured be moved in the third direction to enable the first bracket to be rotated about the pivot axis; and
   wherein the plurality of optical modules are collectively aimed in the first direction by a movement of the first bracket pusher.

3. The lamp for the vehicle of claim 2, wherein the first bracket comprises a plurality of position members that protrude from the first bracket toward the plurality of optical modules in the third direction,
   wherein the second bracket comprises a plurality of aiming members that protrude from the second bracket toward the plurality of optical modules in the third direction,
   wherein the each of the plurality of optical modules comprises a first connector coupled to at least one of the plurality of position members and a second connector coupled to at least one of the plurality of aiming members, and
   wherein in response to moving the second bracket in the third direction toward the plurality of optical modules by the movement of the second bracket pusher, the aiming members move the each of the plurality of optical modules in the third direction via the second connector, thereby enabling the each of the plurality of optical modules to be aimed in the second direction.

4. The lamp for the vehicle of claim 3, wherein a pair of position members among the plurality of position members is disposed at a region corresponding to the each of the plurality of optical modules.

5. The lamp for the vehicle of claim 3, wherein each of the plurality of aiming members is disposed at a region corresponding to the each of the plurality of optical modules.

6. The lamp for the vehicle of claim 3, wherein the plurality of optical modules are arranged in a stepped manner.

7. The lamp for the vehicle of claim 6, wherein at least two of the plurality of aiming members have different lengths to correspond to a configuration of the plurality of optical modules.

8. The lamp for the vehicle of claim 1, wherein the first bracket rotates about a pivot axis, thereby performing a first direction aiming for the each of the plurality of optical modules.

9. The lamp for the vehicle of claim 8, wherein the plurality of optical modules are linearly arranged, and the pivot axis is parallel to an arrangement direction of the plurality of optical modules.

10. The lamp for the vehicle of claim 8, wherein the first bracket includes a pair of pivot bolts, and
   wherein an imaginary line that connects between the pair of pivot bolts corresponds to the pivot axis.

11. The lamp for the vehicle of claim 8, further comprising:
   a first bracket pusher coupled to the first bracket to push the first bracket forward or pull the first bracket backward.

12. The lamp for the vehicle of claim 1, wherein the second bracket is configured to move in a front and rear direction to perform a second direction aiming for the each of the plurality of optical modules.

13. The lamp for the vehicle of claim 12,
   wherein the second bracket pusher coupled to the second bracket is configured to move the second bracket in the front and rear direction.

14. The lamp for the vehicle of claim 3, wherein the second bracket includes openings in regions corresponding to the plurality of position members, and
   wherein the plurality of position members are inserted through the opening.

15. The lamp for the vehicle of claim 1, wherein the each of the plurality of optical modules comprises:
   a light source for emitting light;
   a lens for diffusing the light emitted from the light source; and
   a heat sink for dissipating heat generated from the light source.

16. The lamp for the vehicle of claim 1, wherein the each of the plurality of optical modules comprises:
   a pair of first connectors for first direction aiming; and
   a second connector for second direction aiming,
   wherein the pair of first connectors are spaced apart from each other along the first direction, and
   wherein the second connector is spaced apart along the second direction from an imaginary line connecting between the pair of first connectors.

17. The lamp for the vehicle of claim 16, wherein the pair of first connectors are coupled to position members of the first bracket, and
   wherein the second connector is coupled to aiming members of the second bracket.

* * * * *